(12) United States Patent
Helle et al.

(10) Patent No.: US 8,933,584 B2
(45) Date of Patent: Jan. 13, 2015

(54) METHOD AND APPARATUS FOR DYNAMIC LOAD SHARING

(75) Inventors: Lars Helle, Suldrup (DK); Kim B. Larsen, Hadsund (DK); Anshuman Tripathi, Singapore (SG); Shu Yu Cao, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 961 days.

(21) Appl. No.: 13/120,696

(22) PCT Filed: Sep. 25, 2009

(86) PCT No.: PCT/EP2009/062465
§ 371 (c)(1),
(2), (4) Date: Jun. 23, 2011

(87) PCT Pub. No.: WO2010/034821
PCT Pub. Date: Apr. 1, 2010

(65) Prior Publication Data
US 2011/0248565 A1 Oct. 13, 2011

Related U.S. Application Data

(60) Provisional application No. 61/100,877, filed on Sep. 29, 2008, provisional application No. 61/100,842, filed on Sep. 29, 2008.

(30) Foreign Application Priority Data

Sep. 26, 2008 (EP) .................................... 08165287
Sep. 26, 2008 (EP) .................................... 08165289

(51) Int. Cl.
*H02J 3/00* (2006.01)
*H02P 9/02* (2006.01)
(Continued)

(52) U.S. Cl.
CPC ............... *H02P 25/22* (2013.01); *H02P 9/102* (2013.01); *H02P 9/105* (2013.01); *H02P 25/20* (2013.01); *H02P 2009/004* (2013.01)
USPC ............................................................ 307/14

(58) Field of Classification Search
USPC ........................................................... 307/14
See application file for complete search history.

(56) References Cited

U.S. PATENT DOCUMENTS

| | | | |
|---|---|---|---|
| 6,008,616 A | 12/1999 | Nagayama et al. | |
| 8,519,590 B2 * | 8/2013 | Baba | 310/198 |
| 2003/0085627 A1 | 5/2003 | Lipo et al. | |

FOREIGN PATENT DOCUMENTS

| | | |
|---|---|---|
| DE | 19752241 A1 | 6/1999 |
| EP | 1330020 A2 | 7/2003 |

(Continued)

OTHER PUBLICATIONS

European Patent Office, International Search Report issued in related International Application No. PCT/EP2009/062465 dated Mar. 25, 2010.

(Continued)

*Primary Examiner* — Hal Kaplan
(74) *Attorney, Agent, or Firm* — Patterson + Sheridan, LLP

(57) ABSTRACT

A method for providing dynamic load sharing between a first and a second three phase system is disclosed, wherein the first and second three phase system are connected to a first and second three phase interleaved winding in a generator. The method comprises determining a first q-axis control signal for the first three phase system and a second q-axis control signal for the second three phase system based on a torque and/or power demand for the generator, determining a first d-axis control signal for the first three phase system and a second d-axis control signal for the second three phase system based on a coupling effect between the first and second three phase systems, and adjusting the q-axis control signals and d-axis control signals by including at least one feed forward compensation signal, wherein said at least one feed forward compensation signal is based on a coupling effect between the first and second three phase systems.

31 Claims, 4 Drawing Sheets

(51) Int. Cl.
  *H02P 9/10* (2006.01)
  *H02P 25/22* (2006.01)
  *H02P 25/20* (2006.01)
  *H02P 9/00* (2006.01)

(56) References Cited

FOREIGN PATENT DOCUMENTS

EP  1544987 A1  6/2005
JP  1198264 A  8/1989

OTHER PUBLICATIONS

European Patent Office, International Preliminary Report on Patentability issued in related International Application No. PCT/EP2009/062465 dated Aug. 26, 2010.

Schiferl, R F., et al., "Six Phase Synchronous Machine with AC and DC Stator Connections, Part II: Harmonic Studies and a Proposed Uninterruptible Power Supply Scheme", IEEE Transactions on Power Apparatus and Systems, IEEE Inc. New York, US, vol. PAS-100, No. 8, Aug. 1, 1983, pp. 2694-2701.

\* cited by examiner

METHOD AND APPARATUS FOR DYNAMIC LOAD SHARING

TECHNICAL FIELD

The present invention generally relates to multiphase generators, and more specifically to modular generators comprising multiple three phase generators with interleaved windings. The invention further relates to a controller suitable for such generators.

BACKGROUND OF THE INVENTION

Electric power generators are devices that convert mechanical energy into electrical energy. In an AC generator, the rotor is driven by e.g. a turbine and electric currents are induced in the stator windings of the generator. An AC generator is normally either of a synchronous type or an asynchronous type. For a long time synchronous generators have been used in power systems of different kinds. Synchronous generators are e.g. used both in large power systems, such as nuclear power plants, as well as in small isolated systems, such as wind power plants.

In contrast to the to the asynchronous generator (or induction generator) which uses induction to provide a magnetic flux, the synchronous generator uses either a permanent magnet (PM) or electrical magnetization to produce its magnetization flux. In this respect, the use of permanent magnet generators has found increasing acceptance in recent years, mainly due to the need for inexpensive and reliable excitation components. The application of new permanent magnetic materials has resulted in high-efficiency generators which are superior to other types of generators in many ways.

A synchronous generator normally comprises three phases, but in recent years many investigations related to multiphase generators have been made, a lot of them towards six phase generators. The interest in multiphase generators lies mainly in the fact that with many phases the high currents associated with high power generators can be divided among more phases. Other advantages of multiple phase generators compared to three phase generators are e.g. lower noise levels at the same power level, lower harmonic distortion and lower EMI.

Generators with six or more phase windings are mainly found in full rate wind turbine power conversion application where load sharing and output power distribution among the converter modules as well as output power scalability in low and high wind are desired. One approach to implementation of a multiphase generator, such as a six phase generator, is to use a modular generator, i.e. a generator composed of multiple three phase generators with interleaved windings as illustrated in FIG. 1a with a six-phase 8-pole PM generator.

The advantages of the modular generator with interleaved winding configuration include (1) The mechanical force is always balanced with respect to the generator shaft and the mechanical stress is evenly distributed over the entire generator structure irrespective of the output power level of individual three phase systems; (2) Identical reluctance in the air gap for each three phase systems, which facilitates identification and measurement of the generator parameters in one set of three phase system for control purpose; (3) Failure of any sub-system does not require the entire power generation system to be shutdown. The reliability and availability of power output is thus improved.

Compared to the operation of a single three phase generator, when operating a modular generator comprising e.g. two or more three phase interleaved windings it is important to take into consideration the dynamic load or power sharing of the different three phase systems. More specifically, for the modular PM generator composed of multiple three phase generators with interleaved windings, a conventional current feedback field oriented control is not sufficient due to the significant magnetic coupling between each three phase system.

The normal way to design a six phase modular generator is to arrange two star connected windings with a 30 electrical degrees phase-shift between the two stars. By this arrangement the $11^{th}$ and $13^{th}$ harmonics will be reduced thereby lowering the stress on the generator system. Another way is to split the phase belt of a conventional three-phase machine into two parts with spatial phase separation of 30 electrical degrees. Yet another way is to use a machine with star connected windings and arranging a star-triangle transformer at the output of one generator in order to get a 30 electrical degrees phase-shift between the two generators. However, the first described design is the most common arrangement today.

SUMMARY OF THE INVENTION

In view of the above, an objective of the invention is to provide a method for dynamic torque or power sharing of a modular generator system comprising multiple three phase systems with interleaved windings. The modular generator model in the rotor reference d-q frame may be derived and used as the foundation to realize the dynamic load sharing decoupling control. The decoupling control methodology is described as below with six phase generator as an example of application. The method is general and applicable for any multiple three phase modular generator control.

According to a first aspect, the present invention is realized by a method for providing dynamic load sharing between a first and a second three phase system, said first and second three phase system being connected to a first and second three phase interleaved winding in a generator, the method comprising determining a first q-axis control signal for the first three phase system and a second q-axis control signal for the second three phase system based on a torque and/or power demand for the generator, determining a first d-axis control signal for the first three phase system and a second d-axis control signal for the second three phase system based on a coupling effect between the first and second three phase systems, and adjusting the q-axis control signals and d-axis control signals by including at least one feed forward compensation signal, wherein said at least one feed forward compensation signal is based on a coupling effect between the first and second three phase systems and possibly a rotational bemf coupling effect within each individual three phase system.

An advantage is that the mitigation and compensation of the coupling effects improves the dynamic response of each individual three phase system and minimizes the duration and severity of output power transition due to any operation condition changes of any three phase system.

According to one embodiment of the invention, the first q-axis control signal for the first three phase system and the second q-axis control signal for the second three phase system are based on a torque or power feedback control of each individual three phase systems of the generator.

According to one embodiment of the invention, a demagnetization flux component from the first three phase system and a demagnetization flux component from the second three phase system may be determined, the first and second d-axis control signals may be determined based on said determined demagnetization flux component from the first three phase system and said demagnetization flux component from the second three phase system, and a first and second d-axis current reference signal may be generated based on said first and second d-axis control signals.

According to one embodiment of the invention, at least one generator parameter may be determined, the first and second d-axis control signals may be determined based on said at least one generator parameter, and a first and second d-axis current reference signal may be generated based on said first and second d-axis control signals.

According to one embodiment of the invention, the feed forward compensation signal for the first three phase system may be determined based on a d-axis stator voltage feedback signal from the second three phase system and a d-axis current feedback signal from the second three phase system, and a d-axis stator voltage feed forward compensation signal may be generated based on said feed forward compensation signal. A feed forward compensation signal may be determined for the effects of rotational Back electromotive force by q-axis current of its own three phase system. The d-axis stator voltage feed forward compensation components can be derived from the dq frame voltage equation of the modular PM generator.

According to one embodiment of the invention, the feed forward compensation signal for the first three phase system may be determined based on a q-axis stator voltage feedback signal from the second three phase system and a q-axis current feedback signal from the second three phase system, and a q-axis stator voltage feed forward compensation signal may be generated based on said feed forward compensation signal.

According to another aspect of the invention a generator system is provided. The system comprises
- a modular generator comprising a first and second stator three phase interleaved winding, wherein the second interleaved winding is shifted an electrical angle with respect to the first three phase winding,
- a first and a second three phase system connected to said first and second three phase interleaved winding,
- a torque/power controller block arranged to determine a first q-axis control signal for the first three phase system and a second q-axis control signal for the second three phase system based on a torque and/or power demand for the generator,
- a d-axis current controller block arranged to determine a first d-axis control signal for the first three phase system and a second d-axis control signal for the second three phase system based on a coupling effect between the first and second three phase systems, and
- a feed forward compensation block arranged to adjust the q-axis control signals and d-axis control signals by including at least one feed forward compensation signal, wherein said at least one feed forward compensation signal is based on a coupling effect between the first and second three phase systems.

According to one embodiment of the invention, the torque/power controller block may be arranged to determine the first q-axis control signal for the first three phase system and the second q-axis control signal for the second three phase system based on a torque or power feedback control of each individual three phase systems of the generator.

According to one embodiment of the invention, the generator system may comprise a field weakening block adapted to determine a demagnetization flux component from the first three phase system and a demagnetization flux component from the second three phase system, a current reference signal block adapted to determine the first and second d-axis control signals based on said determined demagnetization flux component from the first three phase system and said demagnetization flux component from the second three phase system and generate a first and second d-axis current reference signal based on said first and second d-axis control signals.

According to one embodiment of the invention, the generator system may comprise a current reference signal block adapted to determine the first and second d-axis control signals based on said at least one generator parameter, and generate a first and second d-axis current reference signal based on said first and second d-axis control signals.

According to one embodiment of the invention, the generator system may comprise a transformation block adapted to determine the feed forward compensation signal for the first three phase system based on a d-axis stator voltage feedback signal from the second three phase system and a d-axis current feedback signal from the second three phase system, and generate a d-axis stator voltage feed forward compensation signal based on said feed forward compensation signal.

According to one embodiment of the invention, the generator system may comprise a transformation block adapted to determine the feed forward compensation signal for the first three phase system based on a q-axis stator voltage feedback signal from the second three phase system and a q-axis current feedback signal from the second three phase system, and generate a q-axis stator voltage feed forward compensation signal based on said feed forward compensation signal.

According to yet another aspect of the invention, a six phase modular generator is provided. The generator comprising a first three phase winding, a second three phase winding interleaved with the first three phase winding and phase shifted at an electrical angle between 70° and 110° from the first three phase winding.

According to yet another aspect of the invention, a nine phase modular generator is provided. The generator comprising a first three phase winding, a second three phase winding interleaved with the first three phase winding and phase shifted at an electrical angle between 10° and 50° from the first three phase winding, and a third three phase winding interleaved with the first and second three phase windings and phase shifted at an electrical angle between 40° and 80° or between 70° and 110° from the first three phase winding.

According to yet another aspect, the present invention is realized by a method for providing dynamic load sharing between a first and a second three phase system, said first and second three phase system being connected to a first and second three phase interleaved winding in a generator, the method comprising
- determining a first stator flux reference signal for the first three phase system and a second stator flux reference signal for the second three phase system based on a coupling effect between the first and second three phase systems,
- determining a first stator flux feedback signal for the first three phase system and a second stator flux feedback signal for the second three phase system based on a coupling effect between the first and second three phase systems
- determining a first stator flux control signal for the first three phase system based on said first stator flux reference signal and said first stator flux feedback signal, and a second stator flux control signal for the second three phase system based on said second stator flux reference signal and said second stator flux feedback signal.

An advantage is that the mitigation and compensation of the coupling effects improves the dynamic response of each individual three phase system and minimizes the duration and severity of output power transition due to any operation condition changes of any three phase system.

According to one embodiment of the invention, a q-axis current reference signal for the first three phase system and a q-axis current reference signal for the second three phase system may be determined, and the first and second stator flux reference signals may be determined based on said q-axis current reference signal for the first three phase system and sad q-axis current reference signal for the second three phase system.

According to one embodiment of the invention, the first stator flux reference signal for the first three phase system may be determined according to $$\psi_{q1}^* = \left(L_{sl} + \frac{3}{2}L_m\right)*i_{q1}^* + \frac{3}{2}*L_m^*i_{q2}^*$$

and the second stator flux reference signal for the second three phase system may be determined according to $$\psi_{q2}^* = \left(L_{sl} + \frac{3}{2}L_m\right)*i_{q2}^* + \frac{3}{2}*L_m^*i_{q1}^*$$

According to one embodiment of the invention, a first and second stator flux d-axis reference signal may be determined based on a field weakening requirement on the first three phase system and a field weakening requirement on the second three phase system.

According to one embodiment of the invention, the first stator flux d-axis reference signal may be determined according to $$\Psi_{d1}^* = \Psi_{mr} - \Delta\Psi_{d1}^*$$

and the second stator flux d-axis reference signal may be determined according to $$\Psi_{d2}^* = \Psi_{mr} - \Delta\Psi_{d2}^*$$

According to one embodiment of the invention, the method may comprise determining a phase voltage signal for at least one of the phases in the first or second three phase system, integrating the determined phase voltage signal, and determining at least one stator flux feed back signal based on said integrated phase voltage signal.

According to another aspect of the invention a generator system is provided, the system comprises a modular generator comprising a first and second stator three phase interleaved winding, wherein the second interleaved winding is shifted an electrical angle with respect to the first three phase winding, a first and a second three phase system connected to said first and second three phase interleaved winding, a flux reference controller adapted to determine a first stator flux reference signal for the first three phase system and a second stator flux reference signal for the second three phase system based on a coupling effect between the first and second three phase systems, a stator flux observer adapted to determine a first stator flux feedback signal for the first three phase system and a second stator flux feedback signal for the second three phase system based on a coupling effect between the first and second three phase systems, and a stator flux controller adapted to determine a first stator flux control signal for the first three phase system based on said first stator flux reference signal and said first stator flux feedback signal, and a second stator flux control signal for the second three phase system based on said second stator flux reference signal and said second stator flux feedback signal.

According to one embodiment of the invention, the system may comprise a torque/power controller adapted to determine a q-axis current reference signal for the first three phase system and a q-axis current reference signal for the second three phase system, and a q-axis stator flux controller adapted to determine the first and second stator flux reference signals based on said q-axis current reference signal for the first three phase system and sad q-axis current reference signal for the second three phase system.

According to one embodiment of the invention, the q-axis stator flux controller may be adapted to determine the first stator flux reference signal for the first three phase system according to $$\psi_{q1}^* = \left(L_{sl} + \frac{3}{2}L_m\right)*i_{q1}^* + \frac{3}{2}*L_m^*i_{q2}^*$$

and determine the second stator flux reference signal for the second three phase system according to $$\psi_{q2}^* = \left(L_{sl} + \frac{3}{2}L_m\right)*i_{q2}^* + \frac{3}{2}*L_m^*i_{q1}^*$$

According to one embodiment of the invention, the system may comprise a d-axis stator flux controller adapted to determine a first and second stator flux d-axis reference signal based on a field weakening requirement on the first three phase system and a field weakening requirement on the second three phase system.

According to one embodiment of the invention, the d-axis stator flux controller may be adapted to determine the first stator flux d-axis reference signal according to $$\Psi_{d1}^* = \Psi_{mr} - \Delta\Psi_{d1}^*$$

and determine the second stator flux d-axis reference signal according to $$\Psi_{d2}^* = \Psi_{mr} - \Delta\Psi_{d2}^*$$

According to one embodiment of the invention, the stator flux observer may be adapted to determine a phase voltage signal for at least one of the phases in the first or second three phase system, integrate the determined phase voltage signal, and determine at least one stator flux feed back signal based on said integrated phase voltage signal.

According to another aspect of the invention a six phase modular generator is provided, the generator comprises a first three phase winding, a second three phase winding interleaved with the first three phase winding and phase shifted at an electrical angle between 70° and 110° from the first three phase winding.

According to another aspect of the invention a nine phase modular generator is provided, the generator comprises
  a first three phase winding,
  a second three phase winding interleaved with the first three phase winding and phase shifted at an electrical angle between 10° and 50° from the first three phase winding,
  a third three phase winding interleaved with the first and second three phase windings and phase shifted at an electrical angle between 40° and 80° or between 70° and 110° from the first three phase winding.

A torque/power scheduler minimizes the dynamic transition caused by cross magnetic coupling between the three phase systems. The slope change of the torque or power reference signal is limited in the torque/power scheduler. Simultaneous changing of the torque/power reference signals of any two sets of three phase systems is avoided in the torque/power scheduler for dynamic decoupling control purpose. That is, according to the invention it is possible to use the torque/power scheduler to mitigate the dynamic transition caused by cross coupling between the three phase systems by imposing slope limiting on the torque or power reference signals and using a fixed time delay to avoid simultaneous change of the torque or power reference signals of any two sets of three phase systems.

In control system implementation, the rotor flux linkage magnitude and the electrical angular shift between two different three phase systems are identified from the back electromotive force of the generator in open circuit when the machine operates at constant speed. This makes the dynamic decoupling control robust against generator parameter variations. The three phase system angle shift $\delta_{2\_1}$ may be measured as the phase difference of a back electromotive force voltage signal between phase a2 and phase a1 disclosed below. The rotor flux magnitude $\Psi mr$ may be computed as the phase back electromotive force voltage peak value divided by the angular speed $\omega_r$.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

In FIG. 1a, phase layout of one three phase system is marked out. The blank stator slots are for the other three phase system that has not been marked out in the figure;

DETAILED DESCRIPTION OF PREFERRED EMBODIMENTS

Figure 1A:
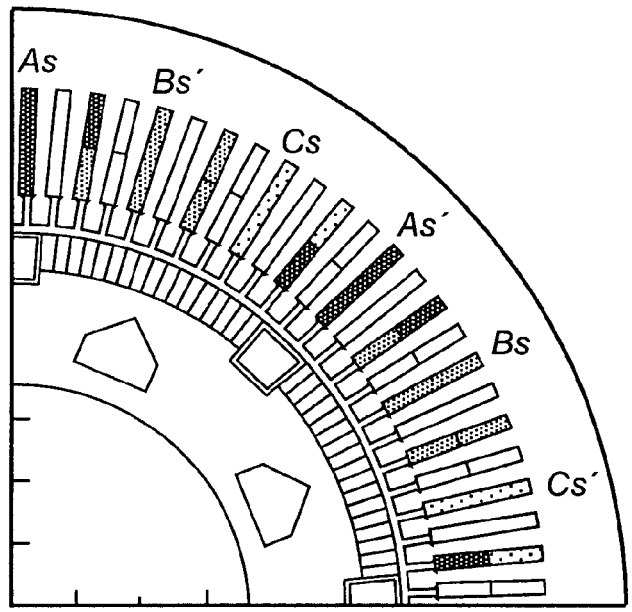
FIG. 1a illustrates a six phase, eight pole modular PM generator with interleaved windings.
Figure 1B:
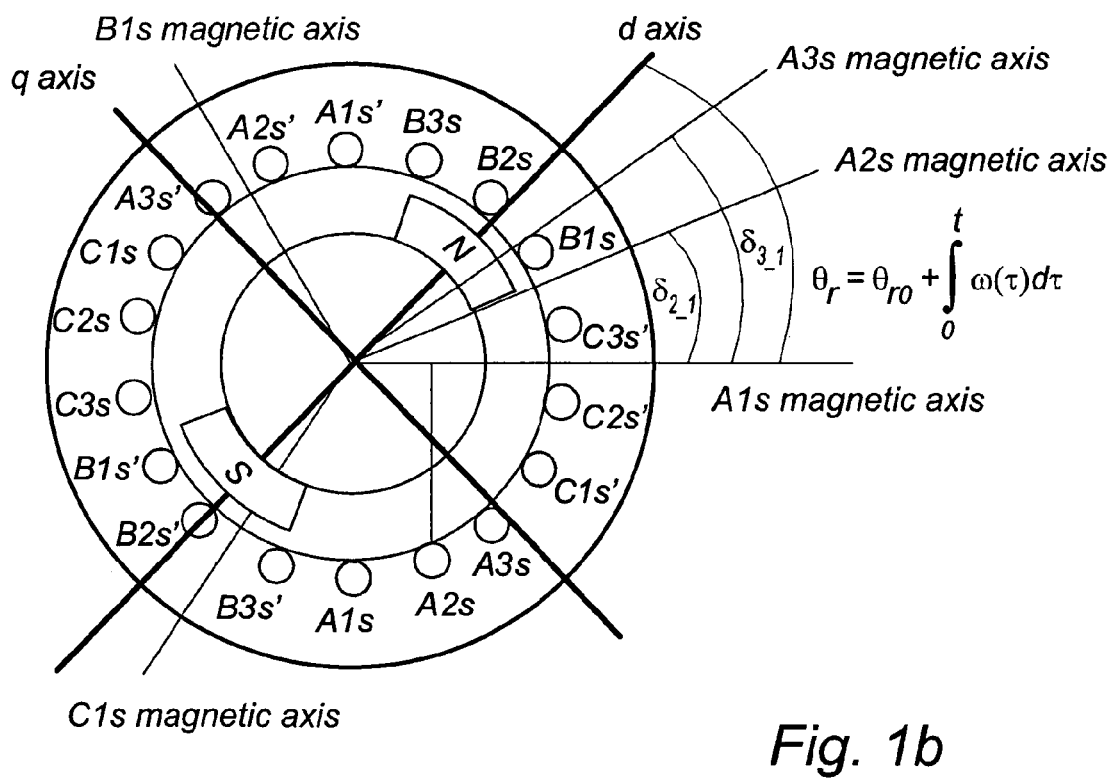
FIG. 1b illustrates a nine phase, two pole modular PM generator.

For a modular PM generator with N set of three phase systems "$a_1b_1c_1$" "$a_2b_2c_2$" ... "$a_Nb_Nc_N$", the magnetic flux axis, the rotor position, and angle shift of the three phase systems are defined according to: the d-axis (direct rotor flux axis) is defined as the rotor magnetic flux axis; the q-axis leads d-axis 90° electrical degree in counterclockwise direction; the rotor position angle $\theta_r$ is defined as the angle between d-axis and phase a1 magnetic flux axis of the three phase system $a_1b_1c_1$; $\delta_{m\_1}$ denotes the electrical angle shift between three phase set $a_mb_mc_m$ and three phase set $a_1b_1c_1$;

The above definitions are graphically illustrated in FIG. 1b with a nine phase two pole machine.

Assuming a sinusoidal distribution of the stator phase windings, the inductive coupling within one three phase system $a_mb_mc_m$ can be represented as matrix "$L_{ss}$", and the inductive coupling between two set of three phase winding $a_nb_nc_n$ and $a_mb_mc_m$ can be presented as matrix "$LM_{n\_m}$".

$$L_{ss} = \begin{bmatrix} L_{sl}+L_m & -L_m/2 & -L_m/2 \\ -L_m/2 & L_{sl}+L_m & -L_m/2 \\ -L_m/2 & -L_m/2 & L_{sl}+L_m \end{bmatrix}$$

Where, $L_{sl}$, denotes the stator phase leakage inductance; $L_m$ denotes the stator phase mutual inductance;

$$LM_{n\_m} = L_m^* \begin{bmatrix} \cos(\delta_{n\_1}-\delta_{m\_1}) & \cos\left(\dfrac{\delta_{n\_1}-\delta_{m\_1}+}{2*\pi/3}\right) & \cos\left(\dfrac{\delta_{n\_1}-\delta_{m\_1}-}{2*\pi/3}\right) \\ \cos\left(\dfrac{\delta_{n\_1}-\delta_{m\_1}-}{2*\pi/3}\right) & \cos(\delta_{n\_1}-\delta_{m\_1}) & \cos\left(\dfrac{\delta_{n\_1}-\delta_{m\_1}+}{2*\pi/3}\right) \\ \cos\left(\dfrac{\delta_{n\_1}-\delta_{m\_1}+}{2*\pi/3}\right) & \cos\left(\dfrac{\delta_{n\_1}-\delta_{m\_1}-}{2*\pi/3}\right) & \cos(\delta_{n\_1}-\delta_{m\_1}) \end{bmatrix}$$

Where, $\delta_{n\_1}-\delta_{m\_1}$ is the angle shift between three phase system $a_nb_nc_n$ and $a_mb_mc_m$.

The phase inductance coupling matrix of the generator can be represented as:

$$L_{a1b1c1\_a2b2c2\_...aNbNcN} = \begin{bmatrix} L_{ss} & LM_{1\_2} & \cdots & LM_{1\_N} \\ LM_{2\_1} & L_{ss} & \cdots & LM_{2\_N} \\ \cdots & \cdots & \cdots & \cdots \\ LM_{N\_1} & LM_{N\_2} & \cdots & L_{ss} \end{bmatrix}$$

Where, $LM_{m\_n}=LM_{n\_m}^T$

The rotor flux seen from the magnetic flux axis of three phase $a_m b_m c_m$ is:

$$\psi_{r\_a_m b_m c_m} = \psi_{mr}^* \begin{bmatrix} \cos(\theta_r - \delta_{m\_1}) \\ \cos(\theta_r - \delta_{m\_1} - 2*\pi/3) \\ \cos(\theta_r - \delta_{m\_1} + 2*\pi/3) \end{bmatrix}$$

Where, $\Psi_{mr}$ denotes the magnitude of rotor flux linkage.

The stator flux equation of a 3*N phase modular generator is:

$$\begin{bmatrix} \psi_{a1b1c1} \\ \psi_{a2b2c2} \\ \cdots \\ \psi_{aNbNcN} \end{bmatrix} = \begin{bmatrix} Lss & LM_{1\_2} & \cdots & LM_{1\_N} \\ LM_{2\_1} & Lss & \cdots & LM_{2\_N} \\ \cdots & \cdots & \cdots & \cdots \\ LM_{N\_1} & LM_{N\_2} & \cdots & Lss \end{bmatrix} * \begin{bmatrix} i_{a1b1c1} \\ i_{a2b2c2} \\ \cdots \\ i_{aNbNcN} \end{bmatrix} + \begin{bmatrix} \psi_{r\_a1b1c1} \\ \psi_{r\_a2b2c2} \\ \cdots \\ \psi_{r\_aNbNcN} \end{bmatrix}$$

The stator voltage equation of a 3*N phase modular generator is:

$$\begin{bmatrix} u_{a1b1c1} \\ u_{a2b2c2} \\ \cdots \\ u_{aNbNcN} \end{bmatrix} = R_s^* \begin{bmatrix} i_{a1b1c1} \\ i_{a2b2c2} \\ \cdots \\ i_{aNbNcN} \end{bmatrix} + \begin{bmatrix} Lss & LM_{1\_2} & \cdots & LM_{1\_N} \\ LM_{2\_1} & Lss & \cdots & LM_{2\_N} \\ \cdots & \cdots & \cdots & \cdots \\ LM_{N\_1} & LM_{N\_2} & \cdots & Lss \end{bmatrix} * \begin{bmatrix} \frac{di_{a1b1c1}}{dt} \\ \frac{di_{a2b2c2}}{dt} \\ \cdots \\ \frac{di_{aNbNcN}}{dt} \end{bmatrix} + \begin{bmatrix} \frac{d\psi_{r\_a1b1c1}}{dt} \\ \frac{d\psi_{r\_a2b2c2}}{dt} \\ \cdots \\ \frac{d\psi_{r\_aNbNcN}}{dt} \end{bmatrix}$$

In order to implement dynamic decoupling of the load/power sharing a rotor reference d-q frame model of the 3*N phase PM generator is derived. Assuming sinusoidal winding distribution, the phase voltages $u_{a_m b_m c_m}$, phase currents $i_{a_m b_m c_m}$ and stator flux $\Psi_{a_m b_m c_m}$ may be transferred to the rotor reference frame according to:

$$u_{d_m q_m 0_m} = K_{sm} * u_{a_m b_m c_m}$$

$$i_{d_m q_m 0_m} = K_{sm} * i_{a_m b_m c_m}$$

$$\psi_{d_m q_m 0_m} = K_{sm} * \psi_{a_m b_m c_m}$$

where $$K_{sm} = \frac{2}{3} \begin{bmatrix} \cos(\theta_r - \delta_{m\_1}) & \cos\left(\theta_r - \delta_{m\_1} - \frac{2*\pi/3}{}\right) & \cos\left(\theta_r - \delta_{m\_1} + \frac{2*\pi/3}{}\right) \\ -\sin(\theta_r - \delta_{m\_1}) & -\sin\left(\theta_r - \delta_{m\_1} - \frac{2*\pi/3}{}\right) & -\sin\left(\theta_r - \delta_{m\_1} + \frac{2*\pi/3}{}\right) \\ \frac{1}{2} & \frac{1}{2} & \frac{1}{2} \end{bmatrix}$$

The Park transformation matrix of a 3*N phase modular PM generator is:

$$K_s = \begin{bmatrix} K_{s1} & 0 & 0 & 0 \\ 0 & K_{s2} & 0 & 0 \\ 0 & 0 & \cdots & 0 \\ 0 & 0 & 0 & K_{sN} \end{bmatrix}$$

The stator flux equation of 3*N phase PM modular generator in rotor reference d-q frame is derived as:

$$\Psi_{d1} = (L_{sl} + (3/2)*L_m)*i_{d1} + (3/2)*L_m*\{i_{d2} + i_{d3} + \ldots + i_{dN}\} + \Psi_{mr}$$

$$\Psi_{q1} = (L_{sl} + (3/2)L_m)*i_{q1} + (3/2)*L_m*\{i_{q2} + i_{q3} + \ldots + i_{qN}\}$$

$$\Psi_{dN} = (L_{sl} + (3/2)*L_m)*i_{dN} + (3/2)*L_m*\{i_{d1} + i_{d2} + \ldots + i_{d(N-1)}\} + \Psi_{mr}$$

$$\Psi_{qN} = (L_{sl} + (3/2)*L_m)*i_{qN} + (3/2)*L_m*\{i_{q1} + i_{q2} + \ldots + i_{q(N-1)}\}$$

The stator voltage equation of the 3*N phase PM modular generator in rotor reference d-q frame is derived as:

$$u_{d1} = R_s * i_{d1} - \omega_r * \{(L_{sL} + (3/2)*L_m)*i_{q1} + (3/2)*L_m*i_{q2} + \ldots + (3/2)*L_m*i_{qN}\} + \left\{(L_{sL} + (3/2)*L_m)*\frac{di_{d1}}{dt} + (3/2)*L_m*\frac{di_{d2}}{dt} + \ldots + (3/2)*L_m*\frac{di_{dN}}{dt}\right\}$$

$$u_{q1} = R_s * i_{q1} + \omega_r * \{(L_{sL} + (3/2)*L_m)*i_{d1} + (3/2)*L_m*i_{d2} + \ldots + (3/2)*L_m*i_{dN}\} + \left\{(L_{sL} + (3/2)*L_m)*\frac{di_{q1}}{dt} + (3/2)*L_m*\frac{di_{q2}}{dt} + \ldots + (3/2)*L_m*\frac{di_{qN}}{dt}\right\} + \psi_{mr}*\omega_r$$

$$u_{dN} = R_s * i_{dN} - \omega_r * \{(L_{sL} + (3/2)*L_m)*i_{qN} + (3/2)*L_m*i_{q1} + \ldots + (3/2)*L_m*i_{q(N-1)}\} + \left\{(L_{sL} + (3/2)*L_m)*\frac{di_{dN}}{dt} + (3/2)*L_m*\frac{di_{d1}}{dt} + \ldots + (3/2)*L_m*\frac{di_{d(N-1)}}{dt}\right\}$$

$$u_{qN} = R_s * i_{qN} + \omega_r * \{(L_{sL} + (3/2)*L_m)*i_{dN} + (3/2)*L_m*i_{d1} + \ldots + (3/2)*L_m*i_{d(N-1)}\} + \left\{(L_{sL} + (3/2)*L_m)*\frac{di_{qN}}{dt} + (3/2)*L_m*\frac{di_{q1}}{dt} + \ldots + (3/2)*L_m*\frac{di_{q(N-1)}}{dt}\right\} + \psi_{mr}*\omega_r$$

The electrical torque of a 3*N phase modular PM generator in the stator phase natural reference frame is:

$$Te = \frac{poles}{2} * [\begin{matrix} i_{a1b1c1}^T & i_{a2b2c2}^T & \cdots & i_{aNbNcN}^T \end{matrix}] * \begin{bmatrix} \frac{\partial \psi_{r\_a1b1c1}}{\partial \theta_r} \\ \frac{\partial \psi_{r\_a2b2c2}}{\partial \theta_r} \\ \cdots \\ \frac{\partial \psi_{r\_aNbNcN}}{\partial \theta_r} \end{bmatrix}$$

Applying the Park transformation matrix of the 3*N phase modular PM generator to the above torque equation, the electrical torque in the rotor reference d-q frame may be expresses as:

$$Te = \frac{3*poles}{4} * \psi_{mr} * \sum_{m=1}^{N} i_{qm}$$

The inductance matrix of a six phase PM machine in the natural phase frame is a function of the phase shift angle $\delta_{2\_1}$ between the two set of windings.

$$L_{a1b1c1\_a2b2c2} = \begin{bmatrix} L_{sl}+L_m & -L_m/2 & -L_m/2 & L_m*\cos(\delta_{2\_1}) & L_m*\cos\left(\frac{\delta_{2\_1}+2*\pi/3}{}\right) & L_m*\cos\left(\frac{\delta_{2\_1}-2*\pi/3}{}\right) \\ -L_m/2 & L_{sl}+L_m & -L_m/2 & L_m*\cos\left(\frac{\delta_{2\_1}-2*\pi/3}{}\right) & L_m*\cos(\delta_{2\_1}) & L_m*\cos\left(\frac{\delta_{2\_1}+2*\pi/3}{}\right) \\ -L_m/2 & -L_m/2 & L_{sl}+L_m & L_m*\cos\left(\frac{\delta_{2\_1}+2*\pi/3}{}\right) & L_m*\cos\left(\frac{\delta_{2\_1}-2*\pi/3}{}\right) & L_m*\cos(\delta_{2\_1}) \\ L_m*\cos(\delta_{2\_1}) & L_m*\cos\left(\frac{\delta_{2\_1}-2*\pi/3}{}\right) & L_m*\cos\left(\frac{\delta_{2\_1}+2*\pi/3}{}\right) & L_{sl}+L_m & -L_m/2 & -L_m/2 \\ L_m*\cos\left(\frac{\delta_{2\_1}+2*\pi/3}{}\right) & L_m*\cos(\delta_{2\_1}) & L_m*\cos\left(\frac{\delta_{2\_1}-2*\pi/3}{}\right) & -L_m/2 & L_{sl}+L_m & -L_m/2 \\ L_m*\cos\left(\frac{\delta_{2\_1}-2*\pi/3}{}\right) & L_m*\cos\left(\frac{\delta_{2\_1}+2*\pi/3}{}\right) & L_m*\cos(\delta_{2\_1}) & -L_m/2 & -L_m/2 & L_{sl}+L_m \end{bmatrix}$$

Figure 2:
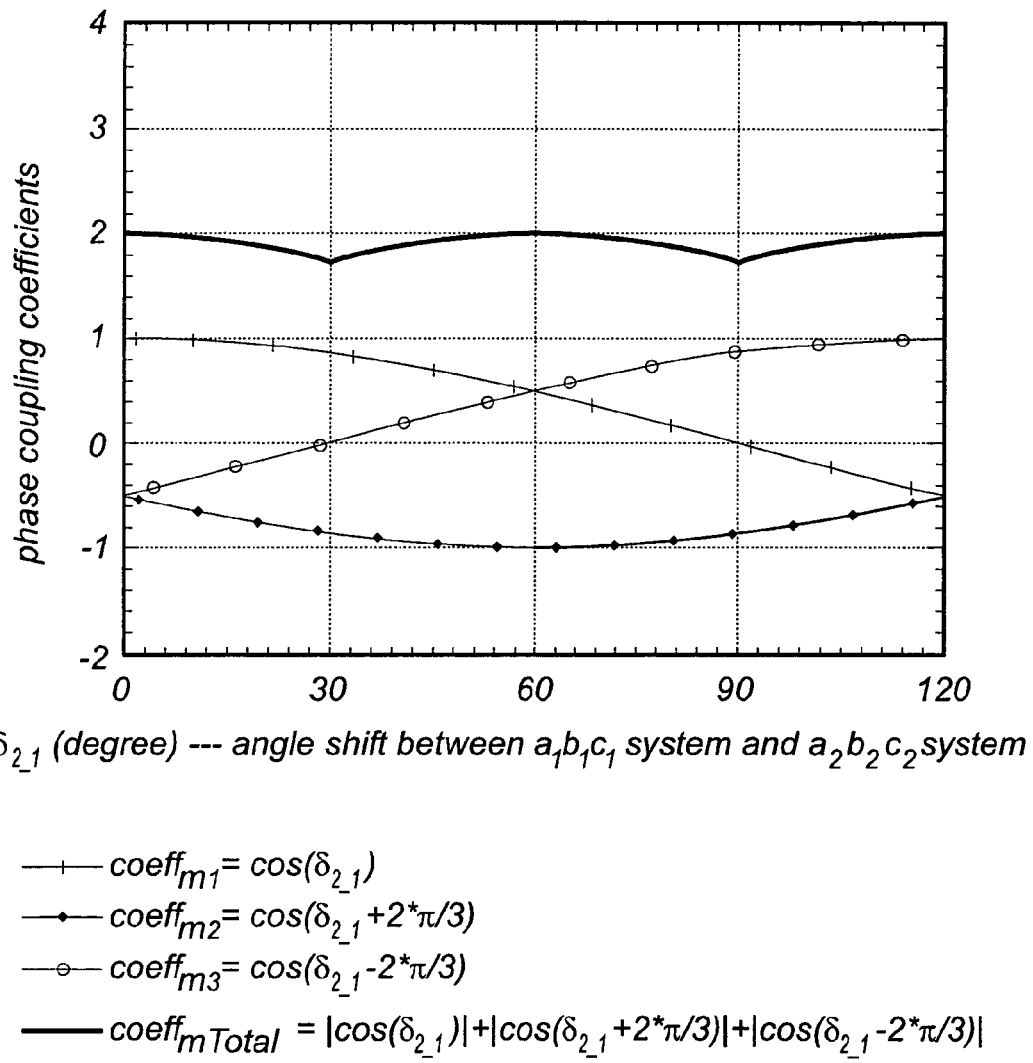
FIG. 2 illustrates the profile of inter-phase coupling as a function of the electrical angle shift between two three phase systems.

The inter-phase coupling coefficients between the two three phase systems are defined as:

$\text{coeff}_{m1} = \cos(\delta_{1\_1})$ $\text{coeff}_{m2} = \cos(\delta_{2\_1} + 2*\pi/3)$ $\text{coeff}_{m3} = \cos(\delta_{2\_1} - 2*\pi/3)$ Treating each phase coupling equally important, the total coupling coefficients of the two three phase system is defined as:

$\text{coeff}_{mTotal} = |\text{coeff}_{m1}| + |\text{coeff}_{m2}| + |\text{coeff}_{m3}|$ FIG. 2 is a graphical presentation of the equations above and illustrates how the inter-phase coupling coefficients $\text{coeff}_{m1}$, $\text{coeff}_{m2}$, $\text{coeff}_{m3}$ and $\text{coeff}_{mTotal}$ between the two three phase systems varies in relation to the electrical angle shift $\delta_{2\_1}$ between the two systems.

From the topmost curve it is determined that the minimum total magnetic coupling between the two system is reached at $\delta_{2\_1}=30°$ and $\delta_{2\_1}=90°$. Consequently, by arranging the windings at an angle shift of either $\delta_{2\_1}=30°$ or $\delta_{2\_1}=90°$ the physical coupling between the two three phase systems will be minimized, thereby minimizing the magnetic circuit saturation due to coupling effects.

For a nine phase modular generator, using similar method of analysis, the minimal physical coupling is achieved at $\delta_{2\_1}=30°$, $\delta_{3\_1}=60°$, or $\delta_{3\_1}=90°$.

For a modular generator with more than twelve phases, the coupling exists between any two three phase systems. It is difficult to find a winding layout that can minimize the total physical coupling.

Figure 3:
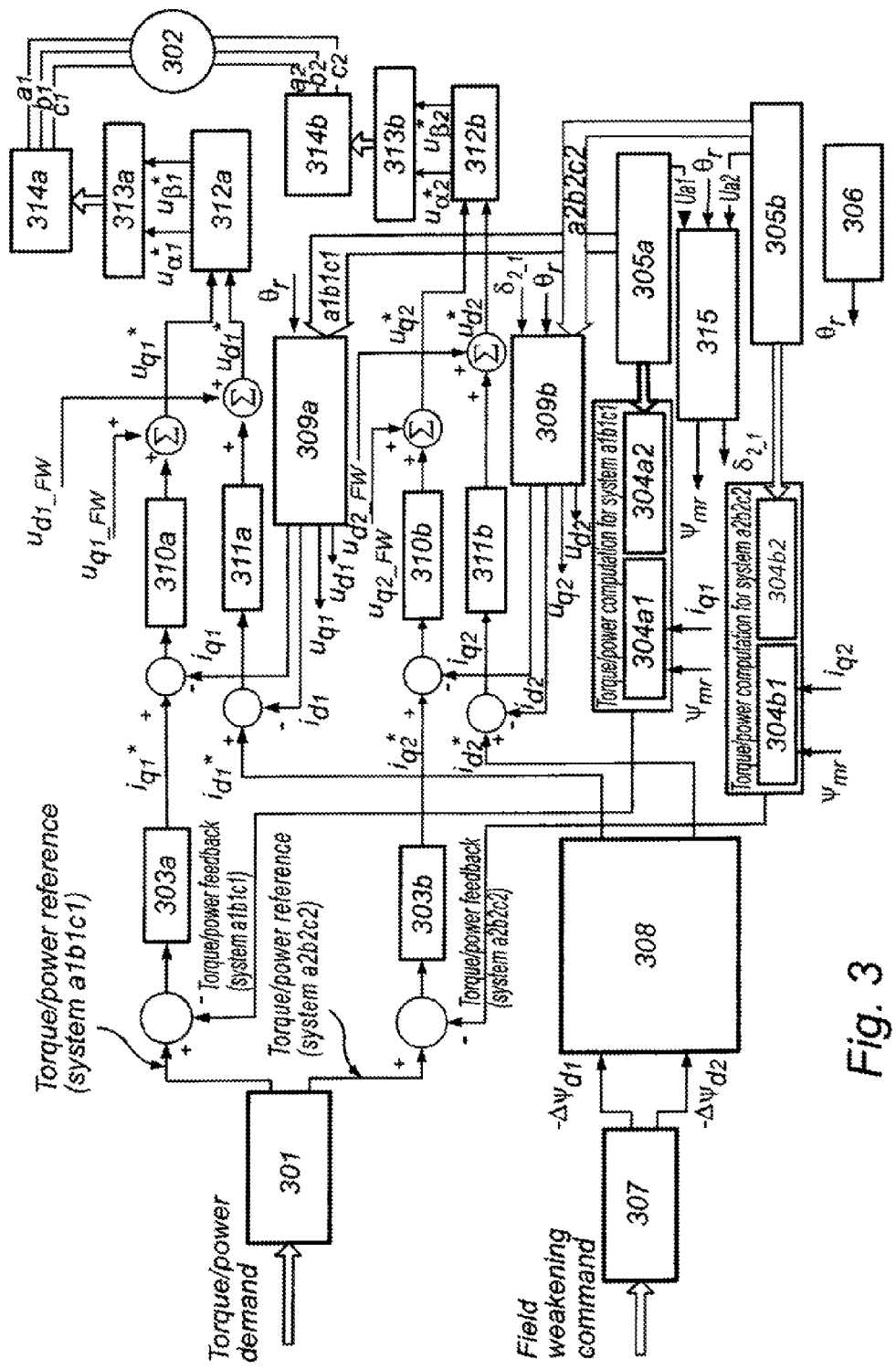
FIG. 3 illustrates a field oriented stator current based feedback dynamic load/power sharing control algorithm according to a first embodiment of the present invention.

FIG. 3 illustrates a field oriented stator current feedback dynamic load/power sharing control algorithm according to a first embodiment of the present invention for realizing dynamic load or power sharing of a modular PM generator composed of multiple three phase systems with interleaved windings. The description below is given for a six phase modular generator as an example of application. The principle and the method is applicable for controlling a dynamic load/power sharing of a modular PM generator with any multiple number of three phase systems for a wind turbine application.

The algorithm shown in the figure is preferably implemented for the for the simplest coupling case with a winding configuration ($\delta_r$) of 90° electrical angle shift between two sets of three phase systems for a six phase, eight pole PM generator as illustrated in FIG. 1a.

In block 315, the angle shift $\delta_{2\_1}$ and the rotor flux $\Psi_{mr}$ are identified from the phase Back electromotive force voltage signals in open circuit condition when generator operates at constant speed. The phase shift electrical angle $\delta_{2\_1}$ is measured as the phase difference of Back electromotive force voltage signals between phase a2 and phase a1. The rotor flux $\Psi_{mr}$ is measured as the result of the phase peak Back electromotive force voltage magnitude ua (peak) divided by the generator angular speed $\omega_r$.

Block 305a measures the phase current signals and phase voltage signals of the three phase system $a_1b_1c_1$. Block 305b measures the phase current signals and phase voltage signals of the three phase system $a_2b_2c_2$.

In block 306, the electrical rotor angle is estimated from a position senorless scheme or computed from $\theta_r=(P/2)*\theta_m$. The rotor position $\theta_m$ (i.e. the mechanical angle with zero degree defined as the rotor d-axis aligned with phase a1 flux axis) of the PM machine is measured using a position encoder mounted on the generator shaft.

Block 309a performs the park transformation of the phase current and phase voltage from $a_1b_1c_1$ frame to rotor reference dq frame. The input signals for block 309a are measured phase voltage $ua_1$, $ub_1$ $uc_1$, phase current $ia_1$ $ib_1$ $ic_1$, and rotor position $\theta_r$. The output signals of block 309a are the current and voltage dq component $id_1$ $iq_1$ $ud_1$ $uq_1$ for the three phase system $a_1b_1c_1$, which are used as signals for current control, electrical torque compuation, and voltage feed forward compensation.

Block 309b performs the park transformation of the phase current and voltage from $a_2b_2c_2$ three phase frame to rotor reference dq frame. The input signals for block 309b are measured phase voltage $ua_2$, $ub_2$ $uc_2$, phase current $ia_2$ $ib_2$ $ic_2$, rotor position $\theta_r$, and the angle shift $\delta_{2\_1}$ between the two sets of three phase systems. The output signals of block 309b are the current and voltage dq component $id_2$ $iq_2$ $ud_2$ $uq_2$ for the three phase system $a_2b_2c_2$.

Either torque control or power control is implemented in the wind turbine generator control system. The torque control is realized by transferring the power command into torque command by dividing the power reference by angular speed $\omega_r$, then closing the control loop based on the torque reference and torque feedback signals. The power control is realized by directly closing the power control loop based on the power reference and power feedback signal with appropriate compensation of the loop bandwidth change due to operation speed level.

A torque or power scheduler 301 is responsible for distributing a torque or power demand for a modular generator 302 into two sets of three phase systems. In order to minimize the dynamic transition caused by the coupling between the two three phase systems, the slope of torque or power demand change should be limited. For the same reason, after a torque or power command change on one set of three phase system, a fixed time delay is inserted before allowing the torque or power command change on the other set of three phase system. In this way, simultaneous change of torque or power command in both three phase systems is avoided.

A torque or power controller 303a for the first system (denoted a1b1c1 in FIG. 3) generates the q-axis current reference, $i_{q1}$*, based on a torque or power reference provided by the torque or power scheduler 301 and a torque or power feedback provided by the first torque observer 304a1 or the power observer 304a2.

The torque observer 304a1 computes the electrical torque of the first system based on the q-axis current and the rotor flux according to:

$$T_{e1} = (3/4) * poles * \Psi_{mr} * i_{q1}$$

The power observer 304a2 computes the generator real power based on the measured stator phase currents and phase voltages according to:

$$P_{e1} = i_{a1}*u_{a1} + i_{b1}*u_{b1} + i_{c1}*u_{c1}$$

A corresponding torque or power controller 303b for the second system (denoted a2b2c2 in FIG. 3) generates the q-axis current reference, $i_{q2}$*, based on a torque or power reference provided by the torque or power scheduler 301 and a torque or power feedback provided by the torque observer 304b1 or the power observer 304b2 according to:

$$T_{e2} = (3/4) * poles * \Psi_{mr} * i_{q2}$$

$$P_{e2} = i_{a2}*u_{a2} + i_{b2}*u_{b2} + i_{c2}*u_{c2}$$

A field weakening scheduler 307 is used to distribute the demagnetization flux components among the two sets of three phase systems. The d-axis current reference signal, $i_{d1}$*, $i_{d2}$*, for each individual three phase system is computed by a d-axis current reference generation block 308 with the coupling effects to other three phase systems included according to $$i^*_{d1} = -\left\{\frac{L_{sl} + (3/2)*L_m}{L_{sl}*(L_{sl} + 3*L_m)}\Delta\psi^*_{d1} - \frac{(3/2)*L_m}{L_{sl}*(L_{sl} + 3*L_m)}\Delta\psi^*_{d2}\right\}$$

$$i^*_{d2} = -\left\{\frac{L_{sl} + (3/2)*L_m}{L_{sl}*(L_{sl} + 3*L_m)}\Delta\psi^*_{d2} - \frac{(3/2)*L_m}{L_{sl}*(L_{sl} + 3*L_m)}\Delta\psi^*_{d1}\right\}$$

The torque or power scheduler 301 and the field weakening scheduler 307 are responsible for achieving optimal operation of the modular generator 302 and converter systems.

The feedback current signals, $i_{d1}$, $i_{q1}$, $i_{d2}$, $i_{q2}$, are subtracted from the current reference signals, $i_{d1}$*, $i_{q1}$*, $i_{d2}$*, $i_{q2}$*, and provided to a q-axis and d-axis current controller 310a, 311a, and 310b, 311b for each system respectively. An appropriate voltage feed-forward component $u_{q1\_FW}$, $u_{d1\_FW}$, $u_{q2\_FW}$, $u_{d2\_FW}$, is added to the each corresponding q-axis/d-axis voltage reference, $u_{q1}$*, $u_{d1}$*, $u_{q2}$*, $u_{d2}$*, respectively, in order to compensate the rotational $B_{emf}$ coupling effect from of its own three phase system and the current/voltage coupling effects from the other three phase system according to $$u_{d1\_FW} = K_{FW} * \frac{(3/2)*L_m}{(L_{sl}+(3/2)*L_m)} * \{u_{d2} - R_s * i_{d2}\} - \frac{L_{sl}*(L_{sl}+3*L_m)}{(L_{sl}+(3/2)*L_m)} * \omega_r * i_{q1}$$

$$u_{q1\_FW} = K_{FW} * \frac{(3/2)*L_m}{(L_{sl}+(3/2)*L_m)} * \{u_{q2} - R_s * i_{q2}\} + \frac{L_{sl}*(L_{sl}+3*L_m)}{(L_{sl}+(3/2)*L_m)} * \omega_r * i_{d1} + \frac{L_{sl}}{(L_{sl}+(3/2)*L_m)} * \psi_{mr} * \omega_r$$

$$u_{d2\_FW} = K_{FW} * \frac{(3/2)*L_m}{L_{sl}+(3/2)*L_m} * \{u_{d1} - R_s * i_{d1}\} - \frac{L_{sl}*(L_{sl}+3*L_m)}{(L_{sl}+(3/2)*L_m)} * \omega_r * i_{q2}$$

$$u_{q2\_FW} = K_{FW} * \frac{(3/2)*L_m}{(L_{sl}+(3/2)*L_m)} * \{u_{q1} - R_s * i_{q1}\} + \frac{L_{sl}*(L_{sl}+3*L_m)}{(L_{sl}+(3/2)*L_m)} * \omega_r * i_{d2} + \frac{L_{sl}}{(L_{sl}+(3/2)*L_m)} * \psi_{mr} * \omega_r$$

where, the feed forward gain $0 < K_{FW} < 1$ is introduced to control the strength of the cross system decoupling signal.

Block 312a transfers the q-axis/d-axis voltage signals, $u_{q1}$*, $u_{d1}$* to the stator stationary $\alpha1\beta1$ frame for the first three phase system a1b1c1 according to:

$$u^*_{\alpha1} = \cos(\theta_r) * u^*_{d1} - \sin(\theta_r) * u^*_{q1}$$

$$u^*_{\beta1} = \sin(\theta_r) * u^*_{d1} + \sin(\theta_r) * u^*_{q1}$$

$$u_{d2\_FW} = -\frac{(3/2)*L_m}{L_{sl}+(3/2)*L_m} * u_{d1} + \frac{(3/2)*L_m}{L_{sl}+(3/2)*L_m} * R_s * i_{d1} - \frac{L_1*(L_1+3*L_m)}{L_{sl}+(3/2)*L_m} * i_{q2} * (P/2) * \omega_m$$

Block 312b transfer the q-axis/d-axis voltage signals, $u_{q2}$*, $u_{d2}$*, to the stator stationary $\alpha2\beta2$ frame for the second three phase system $a_2b_2c_2$ according to:

$$u_{\alpha2} = \cos(\theta_r - \delta_r) * u_{d2}* - \sin(\theta_r - \delta_r) * u_{q2}*$$

$$u_{\beta2} = \sin(\theta_r - \delta_r) * u_{d2}* + \sin(\theta_r - \delta_r) * u_{q2}*$$

The PWM modulators 313a and 313b take the voltage reference in the stator stationary frame as input and generate the gating signals for the PWM converter 314a and 314b respectively. The PWM converter 314a applies the first three phase system voltage ua1, ub1, uc1 to the generator 302. The PWM converter 314b applies the second three phase system ua2, ub2 and uc2 to the generator 302.

The dynamic load sharing between two sets of three phase systems is hence realized by including the coupling effect in the d-axis current reference computation and adding the appropriate decoupling feed-forward voltage compensation in the dq frame voltage reference signal generation The principle of the decoupling method above can be applied to support any physical angle shift between the three phase systems. Other implementation methods for any multiple three phase modular PM generator can also be developed based on the principle illustrated using the six phase generator.

Figure 4:
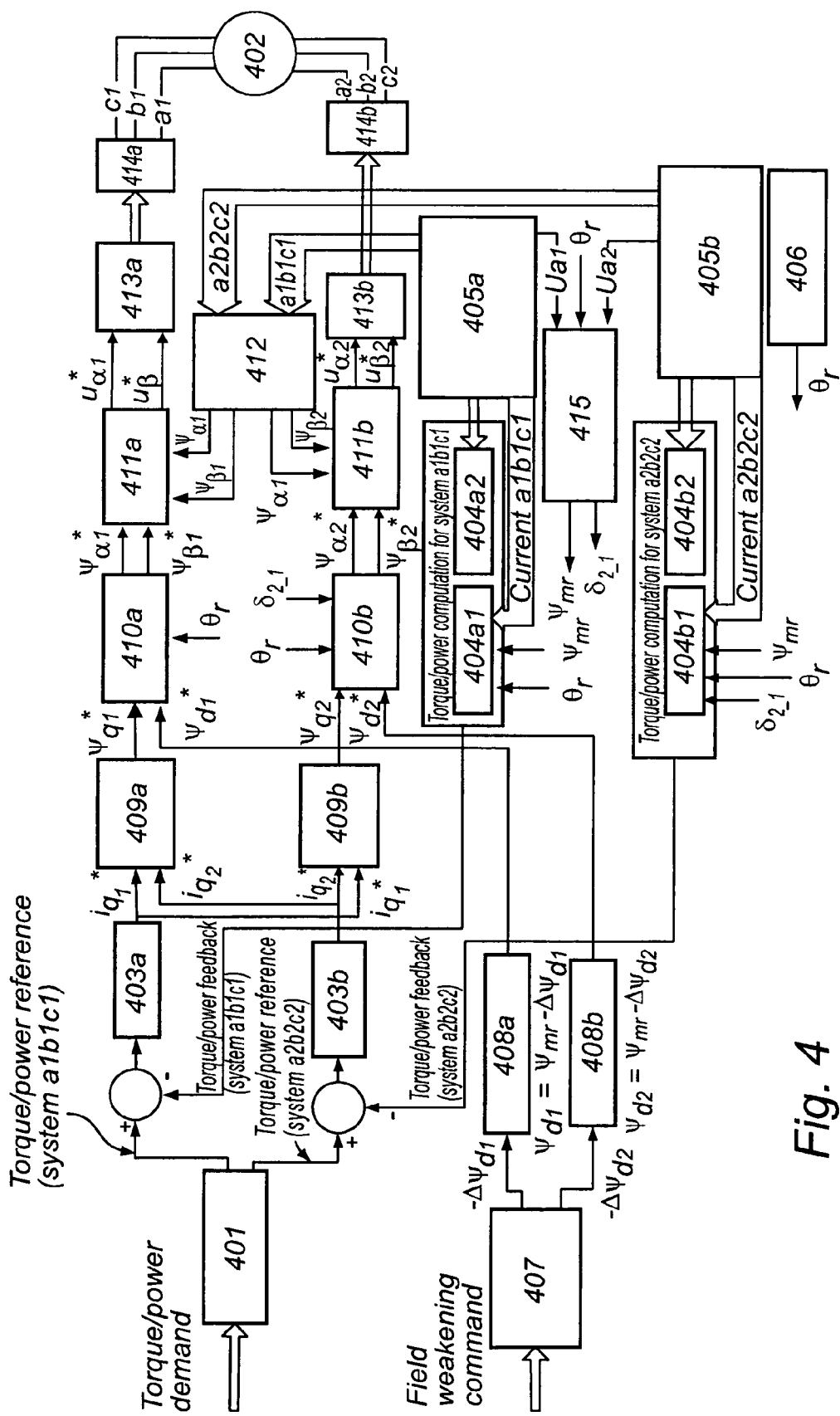
FIG. 4 illustrates a stator flux based dynamic load/power sharing control algorithm according to a second embodiment of the present invention.

FIG. 4 illustrates a stator flux vector control based dynamic load/power sharing algorithm according to a second embodiment of the present invention for realizing dynamic load or power sharing of a modular PM generator composed of multiple three phase systems with interleaved windings. The algorithm may be used for controlling a dynamic load/power sharing of a modular PM generator arranged in a wind turbine.

The algorithm shown in the figure is preferably implemented for a six phase PM generator as illustrated in FIG. 1a. The principle can be applied to stator flux vector control based load/power sharing of any multiple three phase modular generator.

In block 415, the angle shift $\delta_{2\_1}$ and the rotor flux $\Psi_{mr}$ are identified from the phase Bemf voltage signals in the generator open circuit and constant speed operation condition. The phase shift electrical angle $\delta_{2\_1}$ is measured as the phase angle difference of Bemf voltage signals between phase a2 and phase a1. The rotor flux $\Psi_{mr}$ is measured as the phase peak bemf voltage magnitude ua1 (peak) divided by the generator angular speed $\omega_r$.

Block 405a measures the phase current signals and phase voltage signals of the three phase system $a_1b_1c_1$. Block 405b measures the phase current signals and phase voltage signals of the three phase system $a_2b_2c_2$.

In block 406, the electrical rotor angle is estimated from a position senorless scheme or computed from $\theta_r=(P/2)*\theta_m$. The rotor position $\theta_m$ (i.e. the mechanical angle with zero degree defined as the rotor d-axis aligned with phase a1 flux axis) of the PM machine is measured using a position encoder mounted on the generator shaft.

Either torque control or power control is implemented in the wind turbine generator control system. The torque control is realized by transferring the power command into torque command by dividing the power reference by angular speed $\omega_r$, then closing the control loop based on the torque reference and torque feedback signals. The power control is realized by directly closing the power control loop based on the power reference and power feedback signal with appropriate compensation of the loop bandwidth change due to operation speed level.

A torque or power scheduler 401 is responsible for distributing a torque or power demand for a modular generator 402 into two sets of three phase systems. In order to mimimize the dynamic transition caused by the coupling between the two three phase systems, the slope of torque or power demand change should be limited. For same reason, after a torque or power command change on one set of three phase system, a fixed time delay is inserted before allowing the torque or power command change on the other set of three phase system. In this way, simultaneous change of torque or power command in both three phase systems is avoided.

A torque or power controller 403a for the first system (denoted a1b1c1 in FIG. 4) generates the q-axis current reference, $i_{q1}$*, based on a torque or power reference provided by the torque or power scheduler 401 and a torque or power feedback provided by a first torque observer 404a1 or a power observer 404a2.

The torque observer 404a1 is provided with current/voltage measurements from the current and voltage measurement block 405a and rotor position from the rotor position measurement block 406. The output of torque observer is computed according to $T_{e1}=-(\text{poles}/2)*\Psi_{mr}*\{i_{a1}*\sin(\theta_r)+i_{b1}*\sin(\theta_r-2*\pi/3)+i_{c1}*\sin(\theta_r+2*\pi/3)\}$ The power observer 404a2 is provided with current/voltage measurements from the current and voltage measurement block 405a. The output of the power observer 404a2 is computed according to $P_{e1}=i_{a1}*u_{a1}+i_{b1}*u_{b1}+i_{c1}*u_{c1}$ A corresponding torque or power controller 403b for the second system (denoted a2b2c2 in FIG. 4) generates the q-axis current reference, $i_{q2}$*, based on a torque or power reference provided by the torque or power scheduler 401 and a torque or power feedback provided by a torque observer 404b1 or power observer 404b2. The torque observer 404b1 or power observer 404b2 is built in a similar way as the torque observer 404a1 or power observer 404a2. The inputs of torque observer 404b1 are the phase current measurement from block 405b, the rotor position measurement from block 406, and three phase system shift angle $\delta_{2\_1}$ from block 415. The output of the torque observer 404b1 is computed according to:

$T_{e2}=-(\text{poles}/2)*\Psi_{mr}*\{i_{a2}*\sin(\theta_r-\delta_r)+i_{b2}*\sin(\theta_r-\delta_r-2*\pi/3)+i_{c2}*\sin(\theta_r-\delta_r+2*\pi/3)\}$ The inputs of power observer 404b2 are the phase current and phase voltage measurement from block 405b. The output of the torque observer 404b2 is computed according to $P_{e2}=i_{a2}*u_{a2}+i_{b2}*u_{b2}+i_{c2}*u_{c2}$ A field weakening scheduler 407 is used to distribute the demagnetization stator flux components among the two sets of three phase systems. The d-axis stator flux references, $\Psi_{d1}$, $\Psi_{d2}$, are generated by a first and second d-axis stator flux computation block, 408a, 408b, for each three phase system according to:

$\Psi_{d1}*=\Psi_{mr}-\Delta\Psi_{d1}*$ $\Psi_{d2}*=\Psi_{mr}-\Delta\Psi_{d2}*$

In normal operation, the demagnetization flux components are set to zero ($\Delta\Psi_{d1}=\Delta\Psi_{d2}=0$).

The torque or power scheduler 401 and the field weakening scheduler 407 are responsible for achieving optimal operation of the modular generator 402 and converter systems.

The q-axis current references, $i_{q1}$*, $i_{q2}$*, from two sets of systems are used by a first and second q-axis stator flux computation block, 409a, 409b, to generate a q-axis stator flux reference, $\Psi_{q1}$, $\Psi_{q2}$, for each three phase system. The computation includes the coupling from the other three phase system according to $$\psi_{q1}^* = \left(L_{sl} + \frac{3}{2}L_m\right)*i_{q1}^* + \frac{3}{2}*L_m*i_{q2}^*$$

$$\psi_{q2}^* = \left(L_{sl} + \frac{3}{2}L_m\right)*i_{q2}^* + \frac{3}{2}*L_m*i_{q1}^*$$

Blocks 410a and 410b transfer the q-axis stator flux reference, $\Psi_{q1}$, $\Psi_{q2}$, and d-axis stator flux reference $\Psi_{d1}$, $\Psi_{d2}$, for each three phase system into the corresponding first three phase system stator stationary α1β1 frame and second three phase system stator stationary α2β2 frame respectively For the first three phase system the transformed stator flux reference is calculated according to $$\Psi_{\alpha 1} = \cos(\theta_r)*\Psi_{d1}* - \sin(\theta_r)*\Psi_{q1}*$$

$$\Psi_{\beta 1} = \cos(\theta_r)*\Psi_{d1}* + \sin(\theta_r)*\Psi_{q1}*$$

and for the second three phase system $$\Psi_{\alpha 2} = \cos(\theta_r - \delta_r)*\Psi_{d2}* - \sin(\theta_r - \delta_r)*\Psi_{q2}*$$

$$\Psi_{\beta 2} = \sin(\theta_r - \delta_r)*\Psi_{d2}* - \sin(\theta_r - \delta_r)*\Psi_{q2}*$$

The transformed stator flux reference signals $\Psi_{\alpha 1}*$, $\Psi_{\beta 1}*$ and $\Psi_{\alpha 2}*$, $\Psi_{\beta 2}*$, respectively, are then provided to a stator flux oriented controller block 411a, 411b for each system.

The stator flux oriented controller blocks 411a, 411b also receives stator flux feedback signals, $\Psi_{\alpha 1}$, $\Psi_{\beta 1}$ and $\Psi_{\alpha 2}$, $\Psi_{\beta 2}$, from a stator flux observer 412. One preferred embodiment of the stator flux observer 412 is voltage mode flux observer, with which the stator flux is measured directly by integration of the phase voltage after removing the phase resistance voltage drop according to equation given below. The other possible embodiment of stator flux observer 412 is a current mode flux observer, which can be build based on the stator flux equation of a modular generator.

$$u_{\alpha 1} = (2/3)*\{u_{a1} - (1/2)*u_{b1} - (1/2)*u_{c1}\}$$

$$u_{\beta 1} = (2/3)*\{(\sqrt{3}/2)*u_{b1} - (\sqrt{3}/2)*u_{c1}\}$$

$$i_{\alpha 1} = (2/3)*\{i_{a1} - (1/2)*i_{b1} - (1/2)*i_{c1}\}$$

$$i_{\beta 1} = (2/3)*\{(\sqrt{3}/2)*i_{b1} - (\sqrt{3}/2)*i_{c1}\}$$

$$\Psi_{\alpha 1} = \int(u_{\alpha 1} - i_{\alpha 1}*RS)dt$$

$$\Psi_{\beta 1} = \int(u_{\beta 1} - i_{\beta 1}*RS)dt$$

and $$u_{\alpha 2} = (2/3)*\{u_{a2} - (1/2)*u_{b2} - (1/2)*u_{c2}\}$$

$$u_{\beta 2} = (2/3)*\{(\sqrt{3}/2)*u_{b2} - (\sqrt{3}/2)*u_{c2}\}$$

$$i_{\alpha 2} = (2/3)*\{i_{a2} - (1/2)*i_{b2} - (1/2)*i_{c2}\}$$

$$i_{\beta 2} = (2/3)*\{(\sqrt{3}/2)*i_{b2} - (\sqrt{3}/2)*i_{c2}\}$$

$$\Psi_{\alpha 2} = \int(u_{\alpha 2} - i_{\alpha 2}*RS)dt$$

$$\Psi_{\beta 2} = \int(u_{\beta 2} - i_{\beta 2}*RS)dt$$

The outputs of stator flux controller block 411a is a stator voltage reference for the first three phase system a1b1c1 in the stator stationary α1β1 frame which are computed according to the below equation, where $T_{PWM}$ is the PWM switching period.

$$u^*_{\alpha 1} = \frac{\psi^*_{\alpha 1} - \psi_{\alpha 1}}{T_{PWM}}$$

$$u^*_{\beta 1} = \frac{\psi^*_{\beta 1} - \psi_{\beta 1}}{T_{PWM}}$$

The outputs of stator flux controller block 411b is a stator voltage reference for the second three phase system a2b2c2 in the stator stationary α2β2 frameI, which are computated according to $$u^*_{\alpha 2} = \frac{\psi^*_{\alpha 2} - \psi_{\alpha 2}}{T_{PWM}}$$

$$u^*_{\beta 2} = \frac{\psi^*_{\beta 2} - \psi_{\beta 2}}{T_{PWM}}$$

The outputs, $u^*_{\alpha 1}$, $u^*_{\beta 1}$ and $u^*_{\alpha 2}$, $u^*_{\beta 2}$, from stator flux controller blocks 411a, 411b are fed into the PWM modulators 413a, 413b for each three phase system. The PWM modulators 413a and 413b generate the gating signals for the PWM converter 414a and 414b respectively. The PWM converter 414a applies the first three phase system voltage ua1, ub1, uc1 to the generator 402. The PWM converter 414b applies the second three phase system ua2, ub2 and uc2 to the generator 402.

The dynamic load sharing between two sets of three phase systems is hence realized by including the coupling effect in the stator flux reference vector generation.

The principle of the decoupling method above can be applied to support any physical angle shift between three phase systems of the generator. Other implementation methods can also be developed based on the principle illustrated in FIG. 4 for the modular generator with any multiple three phase systems.

The invention has mainly been described above with reference to a few embodiments. However, as is readily appreciated by a person skilled in the art, other embodiments than the ones disclosed above are equally possible within the scope of the invention, as defined by the appended patent claims. The illustrations of embodiment are given for the 6-phase PM modular generator, However, the method can be applied for any 3*N phase PM modular generators using the dq frame flux equation, voltage equation and torque equation that have been presented in the disclosure.

The invention claimed is:

1. A method for providing load sharing between a first and a second three-phase system, the first and second three-phase systems connected to respective first and second three-phase interleaved windings in a generator, the method comprising:
determining a first q-axis control signal for the first three-phase system and a second q-axis control signal for the second three-phase system based on a torque or power demand for the generator;
determining a first d-axis control signal for the first three-phase system and a second d-axis control signal for the second three-phase system based on a coupling effect between the first and second three-phase systems; and
adjusting the q-axis control signals and d-axis control signals by including at least one feed forward compensation signal that is based on a coupling effect between the first and second three-phase systems.

2. The method of claim 1, wherein the first q-axis control signal for the first three-phase system and the second q-axis control signal for the second three-phase system are based on a torque or power feedback control of each individual three phase system of the generator.

3. The method of claim 1, further comprising:
determining a demagnetization flux component from the first three-phase system and a demagnetization flux component from the second three-phase system;

determining the first and second d-axis control signals based on the determined demagnetization flux component from the first three-phase system and the demagnetization flux component from the second three-phase system; and generating a first and second d-axis current reference signal based on the first and second d-axis control signals.

4. The method of claim 1, further comprising:
determining at least one generator parameter;
determining the first and second d-axis control signals based on the at least one generator parameter; and
generating a first and second d-axis current reference signals based on the first and second d-axis control signals.

5. The method of claim 1, further comprising:
determining the feed forward compensation signal for the first three-phase system based on a d-axis stator voltage feedback signal from the second three-phase system and a d-axis current feedback signal from the second three-phase system; and generating a d-axis stator voltage feed forward compensation signal based on the feed forward compensation signal.

6. The method of claim 1, further comprising:
determining the feed forward compensation signal for the first three-phase system based on a q-axis stator voltage feedback signal from the second three-phase system and a q-axis current feedback signal from the second three-phase system; and generating a q-axis stator voltage feed forward compensation signal based on the feed forward compensation signal.

7. The method of claim 1, further comprising:
determining a first stator flux reference signal for the first three-phase system and a second stator flux reference signal for the second three-phase system based on a coupling effect between the first and second three-phase systems;
determining a first stator flux feedback signal for the first three-phase system and a second stator flux feedback signal for the second three-phase system based on a coupling effect between the first and second three-phase systems; and
determining a first stator flux control signal for the first three-phase system based on the first stator flux reference signal and the first stator flux feedback signal, and a second stator flux control signal for the second three-phase system based on the second stator flux reference signal and the second stator flux feedback signal.

8. The method of claim 7, further comprising:
determining a q-axis current reference signal for the first three-phase system and a q-axis current reference signal for the second three-phase system; and determining the first and second stator flux reference signals based on the q-axis current reference signal for the first three-phase system and the q-axis current reference signal for the second three-phase system.

9. The method of claim 8, further comprising:
determining the first stator flux reference signal for the first three-phase system according to $$\psi_{q1}^* = \left(L_{sl} + \frac{3}{2}L_m\right) * i_{q1}^* + \frac{3}{2} * L_m * i_{q2}^*;$$

and
determining the second stator flux reference signal for the second three-phase system according to $$\psi_{q2}^* = \left(L_{sl} + \frac{3}{2}L_m\right) * i_{q2}^* + \frac{3}{2} * L_m * i_{q1}^*,$$

where $\Psi_{g1}^*$ and $\Psi_{g2}^*$ represent the respective first and second stator flux reference signals, $L_{sl}$ represents stator phase leakage inductance, $L_m$ represents stator phase mutual inductance $i_{g1}^*$ and $i_{g2}^*$ represent the respective q-axis current reference signals for the first and second three-phase systems.

10. The method of claim 7, further comprising:
determining a first and second stator flux d-axis reference signal based on a field weakening requirement on the first three-phase system and a field weakening requirement on the second three-phase system.

11. The method of claim 10, further comprising:
determining the first stator flux d-axis reference signal according to $$\Psi_{d1}^* = \Psi_{mr} - \Delta\Psi_{d1}^*, \text{ and}$$

determining the second stator flux d-axis reference signal according to $$\Psi_{d2}^* = \Psi_{mr} - \Delta\Psi_{d2}^*,$$

where $\Psi_{d1}^*$ and $\Psi_{d2}^*$ represent the respective first and second stator flux d-axis reference signals, $\Psi_{mr}$ represents a rotor flux magnitude and $\Delta\Psi_{d1}^*$ and $\Delta\Psi_{d2}^*$ represent respective demagnetization flux components from the first and second three-phase systems.

12. The method of claim 7, further comprising:
determining a phase voltage signal for at least one of the phases in the first or second three-phase system;
integrating the determined phase voltage signal; and
determining at least one stator flux feedback signal based on said integrated phase voltage signal.

13. A generator system comprising:
a modular generator comprising a first and second stator three-phase interleaved windings, wherein the second interleaved winding is shifted at an electrical angle with respect to the first three-phase winding;
a first and a second three-phase system connected to the first and second three-phase interleaved windings;
a torque/power controller block arranged to determine a first q-axis control signal for the first three-phase system and a second q-axis control signal for the second three-phase system based on a torque and/or power demand for the generator;
a d-axis controller block arranged to determine a first d-axis control signal for the first three-phase system and a second d-axis control signal for the second three-phase system based on a coupling effect between the first and second three-phase systems; and
a feed forward compensation block arranged to adjust the q-axis control signals and d-axis control signals by including at least one feed forward compensation signal, wherein the at least one feed forward compensation signal is based on a coupling effect between the first and second three-phase systems.

14. The generator system of claim 13, wherein the torque/power controller block is arranged to determine the first q-axis control signal for the first three-phase system and the second q-axis control signal for the second three-phase system based on a torque or power feedback control of each individual three-phase system of the generator.

15. The generator system of claim 13, further comprising:
a field weakening block adapted to determine a demagnetization flux component from the first three-phase system and a demagnetization flux component from the second three-phase system; and
a current reference signal block adapted to determine the first and second d-axis control signals based on the determined demagnetization flux component from the first three-phase system and the demagnetization flux component from the second three-phase system and generate a first and second d-axis current reference signals based on the first and second d-axis control signals.

16. The generator system of claim 13, further comprising:
a current reference signal block adapted to determine the first and second d-axis control signals based on said at least one generator parameter, and to generate a first and second d-axis current reference signals based on the first and second d-axis control signals.

17. The generator system of claim 13, further comprising:
a transformation block adapted to determine the feed forward compensation signal for the first three-phase system based on a d-axis stator voltage feedback signal from the second three phase system and a d-axis current feedback signal from the second three-phase system, and to generate a d-axis stator voltage feed forward compensation signal based on the feed forward compensation signal.

18. The generator system of claim 13, further comprising:
a transformation block adapted to determine the feed forward compensation signal for the first three-phase system based on a q-axis stator voltage feedback signal from the second three-phase system and a q-axis current feedback signal from the second three-phase system, and to generate a q-axis stator voltage feed forward compensation signal based on the feed forward compensation signal.

19. The generator system of claim 13, further comprising:
a flux reference controller adapted to determine a first stator flux reference signal for the first three-phase system and a second stator flux reference signal for the second three-phase system based on a coupling effect between the first and second three-phase systems;
a stator flux observer adapted to determine a first stator flux feedback signal for the first three-phase system and a second stator flux feedback signal for the second three-phase system based on a coupling effect between the first and second three-phase systems; and
a stator flux controller adapted to determine a first stator flux control signal for the first three-phase system based on the first stator flux reference signal and the first stator flux feedback signal, and to determine a second stator flux control signal for the second three-phase system based on the second stator flux reference signal and the second stator flux feedback signal.

20. The generator system of claim 19, further comprising:
a torque/power controller adapted to determine a q-axis current reference signal for the first three-phase system and a q-axis current reference signal for the second three-phase system; and
a q-axis stator flux controller adapted to determine the first and second stator flux reference signals based on the q-axis current reference signal for the first three-phase system and sad the q-axis current reference signal for the second three-phase system.

21. The generator system of claim 20, wherein the q-axis stator flux controller is adapted to determine the first stator flux reference signal for the first three-phase system according to $$\psi_{q1}^* = \left(L_{sl} + \frac{3}{2}L_m\right) * i_{q1}^* + \frac{3}{2} * L_m * i_{q2}^*$$

and to determine the second stator flux reference signal for the second three-phase system according to $$\psi_{q2}^* = \left(L_{sl} + \frac{3}{2}L_m\right) * i_{q2}^* + \frac{3}{2} * L_m * i_{q1}^*,$$

where $\Psi_{q1}^*$ and $\Psi_{q2}^*$ represent the respective first and second stator flux reference signals $L_{sl}$ represents stator phase leakage inductance, $L_m$ represents stator phase mutual inductance $i_{q1}^*$ and $i_{q2}^*$ represent the respective q-axis current reference signals for the first and second three-phase systems.

22. The generator system of claim 19, further comprising:
a d-axis stator flux controller adapted to determine a first and second stator flux d-axis reference signals based on a field weakening requirement on the first three-phase system and a field weakening requirement on the second three-phase system.

23. The generator system of claim 22, wherein the d-axis stator flux controller is further adapted to determine the first stator flux d-axis reference signal according to $$\Psi_{d1}^* = \Psi_{mr} - \Delta\Psi_{d1}^*$$

and to determine the second stator flux d-axis reference signal according to $$\Psi_{d2}^* = \Psi_{mr} - \Delta\Psi_{d2}^*,$$

where $\Psi_{d1}^*$ and $\Psi_{d2}^*$ represent the respective first and second stator flux d-axis reference signals $\Psi_{mr}$ represents a rotor flux magnitude and $\Delta\Psi_{d1}^*$ and $\Delta\Psi_{d2}^*$ represent respective demagnetization flux components from the first and second three-phase systems.

24. The generator system of claim 19, wherein the stator flux observer is further adapted to determine a phase voltage signal for at least one of the phases in the first or second three-phase systems, to integrate the determined phase voltage signal, and to determine at least one stator flux feedback signal based on said integrated phase voltage signal.

25. A nine phase modular generator comprising:
a first three-phase winding;
a second three-phase winding interleaved with the first three-phase winding and phase shifted at an electrical angle between 10° and 50° from the first three-phase winding; and
a third three-phase winding interleaved with the first and second three-phase windings and phase shifted at an electrical angle between 40° and 80° or between 70° and 110° from the first three-phase winding.

26. A method for providing load sharing between a first and a second three-phase system, the first and second three phase systems connected to respective first and second three-phase interleaved windings in a generator, the method comprising:
determining a demagnetization flux component from the first three-phase system and a demagnetization flux component from the second three-phase system;
determining the first and second d-axis control signals based on the determined demagnetization flux component from the first three-phase system and the demagnetization flux component from the second three-phase system; and generating first and second d-axis current reference signals based on the first and second d-axis control signals.

27. A method for providing load sharing between a first and a second three-phase system, the first and second three-phase systems connected to respective first and second three-phase interleaved windings in a generator, the method comprising:
determining at least one generator parameter;
determining first and second d-axis control signals based on the at least one generator parameter; and
generating first and second d-axis current reference signals based on the first and second d-axis control signals.

28. A method for providing load sharing between a first and a second three-phase system, the first and second three-phase systems connected to respective first and second three-phase interleaved windings in a generator, the method comprising:
determining a first stator flux reference signal for the first three-phase system and a second stator flux reference signal for the second three-phase system based on a coupling effect between the first and second three-phase systems;
determining a first stator flux feedback signal for the first three-phase system and a second stator flux feedback signal for the second three-phase system based on a coupling effect between the first and second three-phase systems; and
determining a first stator flux control signal for the first three-phase system based on the first stator flux reference signal and the first stator flux feedback signal, and a second stator flux control signal for the second three-phase system based on the second stator flux reference signal and the second stator flux feedback signal.

29. A generator system comprising:
a modular generator comprising first and second stator three-phase interleaved windings, wherein the second interleaved winding is shifted at an electrical angle with respect to the first three-phase winding;
a first and a second three-phase system connected to the first and second three-phase interleaved windings;
a field weakening block adapted to determine a demagnetization flux component from the first three-phase system and a demagnetization flux component from the second three-phase system; and
a current reference signal block adapted to determine the first and second d-axis control signals based on the determined demagnetization flux components from the first and second three-phase systems and to generate first and second d-axis current reference signals based on the first and second d-axis control signals.

30. A generator system comprising:
a modular generator comprising first and second stator three-phase interleaved windings, wherein the second interleaved winding is shifted at an electrical angle with respect to the first three-phase winding;
a first and a second three-phase system connected to the first and second three-phase interleaved windings; and
a current reference signal block adapted to determine first and second d-axis control signals based on at least one generator parameter, and to generate first and second d-axis current reference signals based on the first and second d-axis control signals.

31. A generator system comprising:
a modular generator comprising first and second stator three-phase interleaved windings, wherein the second interleaved winding is shifted at an electrical angle with respect to the first three-phase winding;
a first and a second three-phase system connected to the first and second three-phase interleaved windings;
a flux reference controller adapted to determine a first stator flux reference signal for the first three-phase system and a second stator flux reference signal for the second three-phase system based on a coupling effect between the first and second three-phase systems;
a stator flux observer adapted to determine a first stator flux feedback signal for the first three-phase system and a second stator flux feedback signal for the second three-phase system based on a coupling effect between the first and second three-phase systems; and
a stator flux controller adapted to determine a first stator flux control signal for the first three-phase system based on the first stator flux reference signal and the first stator flux feedback signal, and to determine a second stator flux control signal for the second three-phase system based on the second stator flux reference signal and the second stator flux feedback signal.

* * * * *